(12) United States Patent
Bihamta et al.

(10) Patent No.: US 12,466,333 B2
(45) Date of Patent: Nov. 11, 2025

(54) ELECTRONIC DEVICE MOUNTING SYSTEM FOR A VEHICLE

(71) Applicant: GM Global Technology Operations LLC, Detroit, MI (US)

(72) Inventors: Reza Bihamta, Windsor (CA); Todd Anthony Demaray, Capac, MI (US); Li-Ban Lawrence Chiu, Troy, MI (US); Pankaj-Aravind Palaskar, Spring Arbor, MI (US); Eryk Jerzy Dabrowski, Bloomfield Hills, MI (US); Sean Shihong Yu, Troy, MI (US); Kamilo Susman, Royal Oak, MI (US); Stanley Samuel, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 283 days.

(21) Appl. No.: 18/456,969

(22) Filed: Aug. 28, 2023

(65) Prior Publication Data
US 2025/0074328 A1    Mar. 6, 2025

(51) Int. Cl.
*B60R 11/02*    (2006.01)
*B60R 11/00*    (2006.01)

(52) U.S. Cl.
CPC ... *B60R 11/0235* (2013.01); *B60R 2011/0015* (2013.01); *B60R 2011/0066* (2013.01); *B60R 2011/0085* (2013.01)

(58) Field of Classification Search
CPC ..... B60R 2011/0276; B60R 2011/0235; B60R 2011/0015; B60R 2011/0017; B62D 1/192; B60N 2/42709
USPC ......................................... 248/900, 542, 548
See application file for complete search history.

(56) References Cited

U.S. PATENT DOCUMENTS

| | | | | |
|---|---|---|---|---|
| 2,234,360 | A * | 3/1941 | Whitson | A62C 37/50 248/548 |
| 5,359,349 | A * | 10/1994 | Jambor | B60R 11/0235 345/905 |
| 7,393,029 | B2 * | 7/2008 | Glasgow | B60N 2/4235 293/132 |
| 7,597,393 | B1 * | 10/2009 | Tuccinardi | B60R 11/0211 297/217.3 |

(Continued)

FOREIGN PATENT DOCUMENTS

| CN | 113613935 A | 11/2021 |
|---|---|---|
| DE | 102013016805 A1 | 4/2015 |

(Continued)

OTHER PUBLICATIONS

German Application No. 10 2023 128 174.7 filed Oct. 14, 2023; German Office Action dated Jun. 27, 2024; 5 pages.

*Primary Examiner* — Justin M Larson
(74) *Attorney, Agent, or Firm* — CANTOR COLBURN LLP

(57) ABSTRACT

An electronic device mounting system for a vehicle includes a mounting element configured to connect with a vehicle seat surface and a bracket supported by the mounting element. The bracket has a plurality of walls defining a hollow interior. A deformation assembly including a deformable element and a deformable member is arranged in the hollow interior. The deformable element is elastically and inelastically deformable based in impact forces passing into the bracket.

20 Claims, 5 Drawing Sheets

(56) References Cited

U.S. PATENT DOCUMENTS

| | | | |
|---|---|---|---|
| 9,487,157 B1 | 11/2016 | Vinton | |
| 9,669,932 B2 * | 6/2017 | Murata | H05K 5/0217 |
| 10,448,533 B2 * | 10/2019 | Maisenbacher | B60K 35/60 |
| 10,525,899 B2 * | 1/2020 | Mullen | B60R 11/0235 |
| 11,370,364 B2 | 6/2022 | Mitchell, Jr. et al. | |
| 12,134,355 B2 * | 11/2024 | Viswaraj | B60K 35/22 |
| 12,179,672 B2 * | 12/2024 | Chang | F16F 7/003 |
| 12,240,606 B2 * | 3/2025 | Lalli | B60N 3/004 |
| 2006/0028038 A1 * | 2/2006 | Glasgow | F16F 7/125 |
| | | | 293/132 |
| 2022/0185199 A1 | 6/2022 | Syldatke | |

FOREIGN PATENT DOCUMENTS

| | | | | |
|---|---|---|---|---|
| DE | 102016111614 A1 | | 1/2017 | |
| DE | 102020103683 A1 | | 8/2020 | |
| EP | 3647110 A1 | * | 5/2020 | B64D 11/0619 |
| FR | 3009812 A1 | * | 2/2015 | B60R 11/0252 |

* cited by examiner

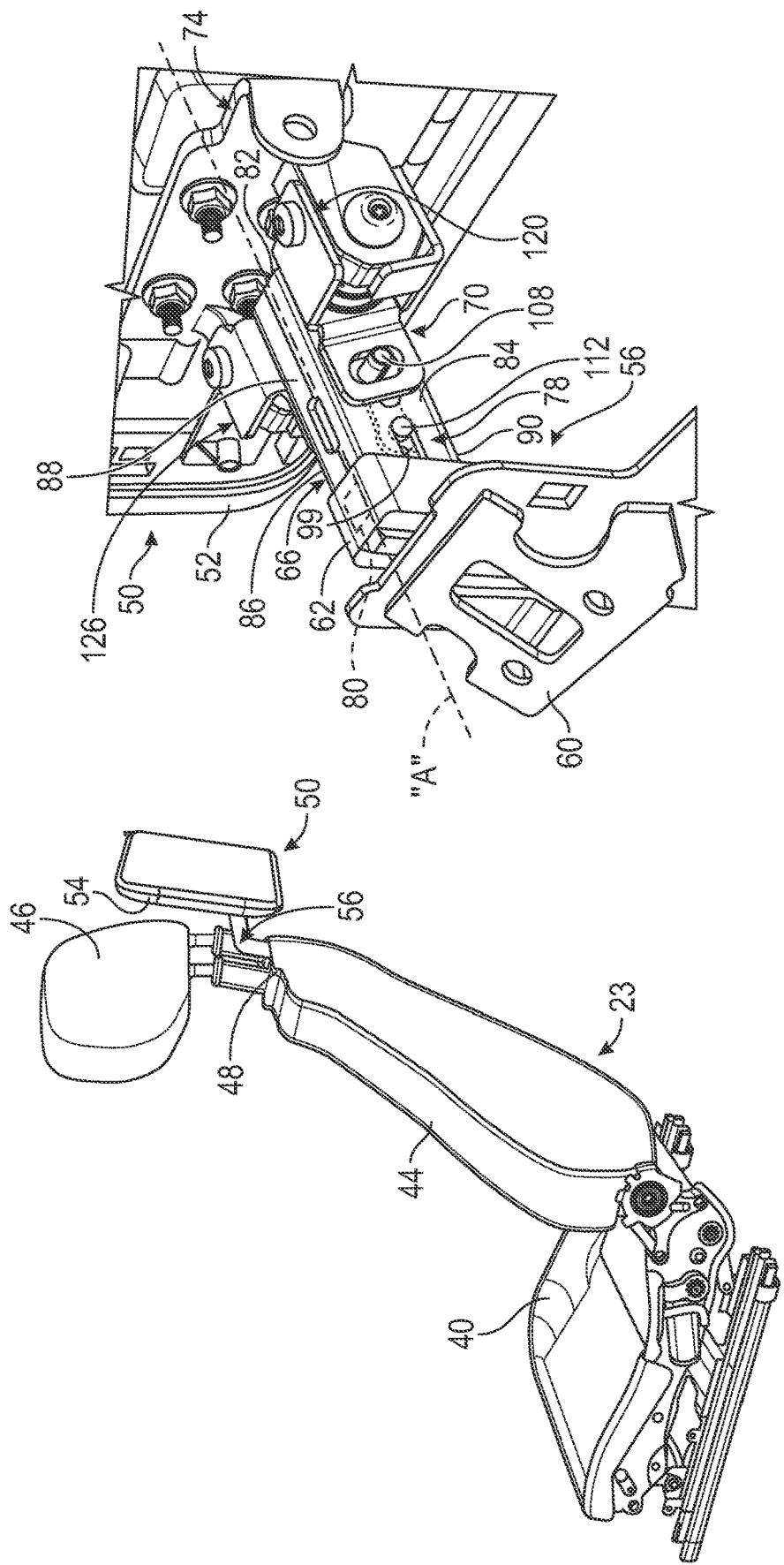

ELECTRONIC DEVICE MOUNTING SYSTEM FOR A VEHICLE

The subject disclosure relates to the art of vehicle mounting systems and, more particularly, to an electronic device mounting system for a vehicle.

Many vehicles include infotainment systems including a display. Depending on vehicle model, the display may be mounted in various portions of a vehicle seat. The infotainment system may be used by passengers to access the Internet, read books, stream audio, and/or watch movies. In most cases, the infotainment system is integrated into or supported adjacent to a front seat mounted headrest. Mounting the infotainment system in or near the head rest presents the display at eye level for most passengers.

While eye level viewing is preferred, such a mounting location places the system in a position to be contacted by a passenger's head during a sudden deceleration. As such, the infotainment system must include an energy absorption system that can mitigate impact forces. Currently, many infotainment systems include a plastically deformable member that absorbs impact loads. Unfortunately, the plastically deformable member may be damaged when a passenger pushes or pulls on the infotainment system while getting into and out from the vehicle. Accordingly, it is desirable to provide an infotainment system mount that not only complies with federal head impact criteria (HIC) standards but also allows for some elastic deformation that may accommodate passenger manipulations.

SUMMARY

An electronic device mounting system for a vehicle, in accordance with a non-limiting example, includes a mounting element configured to connect with a vehicle seat surface and a bracket supported by the mounting element. The bracket has a plurality of walls defining a hollow interior. A deformation assembly including a deformable element and a deformable member is arranged in the hollow interior. The deformable element is elastically and inelastically deformable based in impact forces passing into the bracket.

In addition to one or more of the features described herein the bracket includes a first end coupled to the mounting element and a second end, opposite the first end, a deformation axis being defined between the first end and the second end.

In addition to one or more of the features described herein at least one of the plurality of walls of the bracket includes an inspection opening.

In addition to one or more of the features described herein the deformable element includes a visual indicator visible through the inspection opening, the visual indicator signaling that the electronic device mounting system has been exposed to a force along the deformation axis that exceeds a deformation threshold.

In addition to one or more of the features described herein the deformable member is configured to compress along the deformation axis.

In addition to one or more of the features described herein the deformable member is formed from one of an elastomer, a foam, and a plastic.

In addition to one or more of the features described herein the deformable member is formed from one of a metal and a metal alloy.

In addition to one or more of the features described herein the plurality of walls of the bracket includes a first side wall and a second side wall, the first side wall including a first slotted opening and the second side wall including a second slotted opening, each of the first slotted opening and the second slotted opening having a major dimension extending along the deformation axis.

In addition to one or more of the features described herein a hinge member including a first bracket element coupled to the first side wall and a second bracket element coupled to the second side wall, the first bracket element including a first electronic device mounting portion and the second bracket element including a second electronic device mounting portion.

In addition to one or more of the features described herein a first fastener passing through the first bracket element, through the first slotted opening and into the deformable element and a second fastener passing through the second bracket element, through the second slotted opening and into the deformable element.

A vehicle, in accordance with a non-limiting example, include a body including a passenger compartment, a seat arranged in the passenger compartment, the seat including a seatback, and an electronic device mounting system coupled to the seat back. The electronic device mounting system includes a mounting element configured to connect with the seatback and a bracket supported by the mounting element. The bracket has a plurality of walls defining a hollow interior. A deformation assembly including a deformable element and a deformable member is arranged in the hollow interior. The deformable element is elastically and inelastically deformable based in impact forces passing into the bracket.

In addition to one or more of the features described herein the bracket includes a first end coupled to the mounting element and a second end, opposite the first end, a deformation axis being defined between the first end and the second end.

In addition to one or more of the features described herein at least one of the plurality of walls of the bracket includes an inspection opening.

In addition to one or more of the features described herein the deformable element includes a visual indicator visible through the inspection opening, the visual indicator signaling that the electronic device mounting system has been exposed to a force along the deformation axis that exceeds a deformation threshold.

In addition to one or more of the features described herein the deformable member is configured to compress along the deformation axis.

In addition to one or more of the features described herein the deformable member is formed from one of an elastomer, a foam, and a plastic.

In addition to one or more of the features described herein the deformable member is formed from one of a metal and a metal alloy.

In addition to one or more of the features described herein the plurality of walls of the bracket includes a first side wall and a second side wall, the first side wall including a first slotted opening and the second side wall including a second slotted opening, each of the first slotted opening and the second slotted opening having a major dimension extending along the deformation axis.

In addition to one or more of the features described herein a hinge member including a first bracket element coupled to the first side wall and a second bracket element coupled to the second side wall, the first bracket element including a first electronic device mounting portion and the second bracket element including a second electronic device mounting portion.

In addition to one or more of the features described herein a first fastener passing through the first bracket element, through the first slotted opening and into the deformable element and a second fastener passing through the second bracket element, through the second slotted opening and into the deformable element.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 2 is a left side perspective view of a front seat in the vehicle of FIG. 1 supporting the electronic device mounting system, in accordance with a non-limiting example;

FIG. 3 is a detailed view of the electronic device mounting system, in accordance with a non-limiting example;

DETAILED DESCRIPTION

Figure 1:
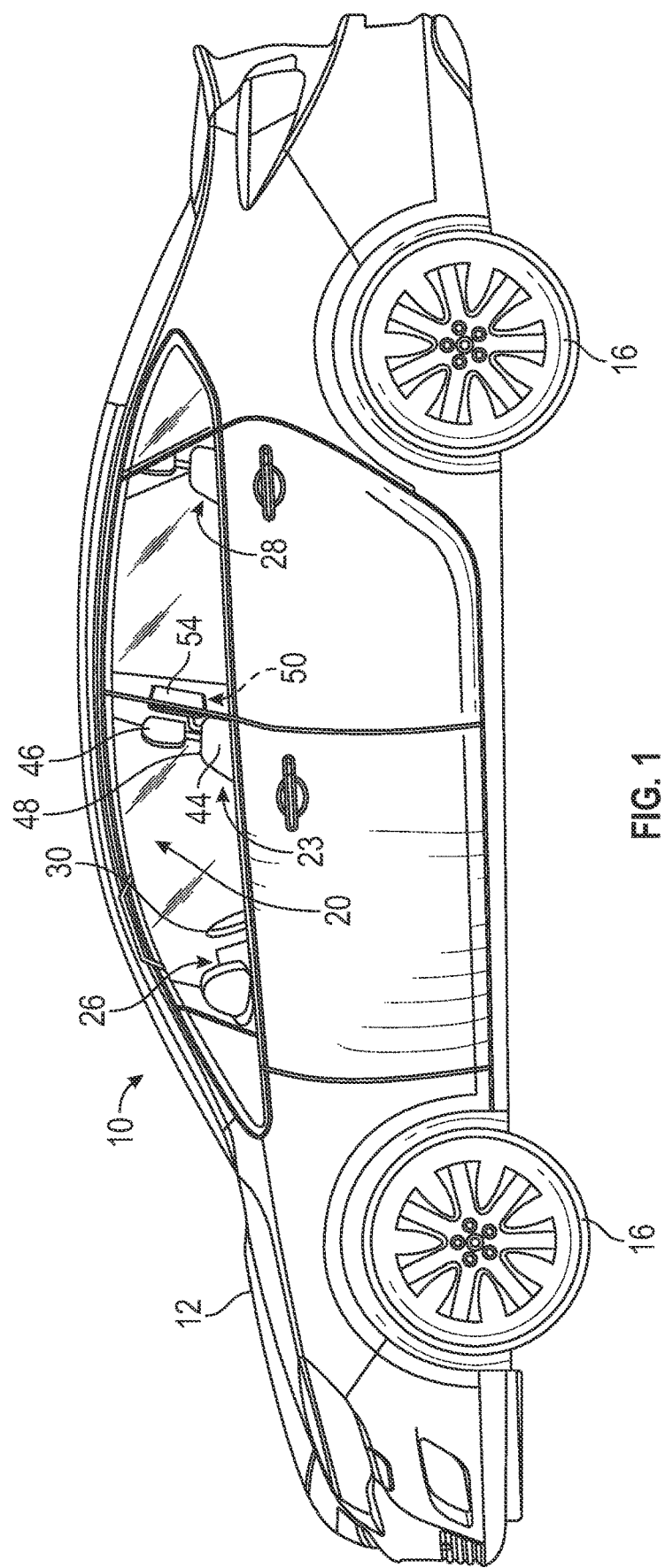
FIG. 1 is a left side view of a vehicle including an electronic device mounting system, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a plurality of wheels 16. One or more of the plurality of wheels 16 are steerable. Body 12 defines, in part, a passenger compartment 20 having front seats 23 positioned behind a dashboard 26. Vehicle 10 also includes rear passenger seats 28 arranged behind front seats 23. A steering control 30 is arranged between front seats 23 and dashboard 26.

As shown in FIG. 2, front seat 23 includes a seat base 40, FIG. 2, and a seat back 44 supporting a head rest 46. Head rest 46 is supported on an upper surface 48 of seat back 44. Upper surface 48 of seat back 44 also supports an infotainment system 50 having a display 54. An electronic device mount 56 supports infotainment system 50 on seat back 44. At this point, it should be understood that display 54 may be an interactive display or simply present images to a passenger without allowing for any interaction.

Figure 4:
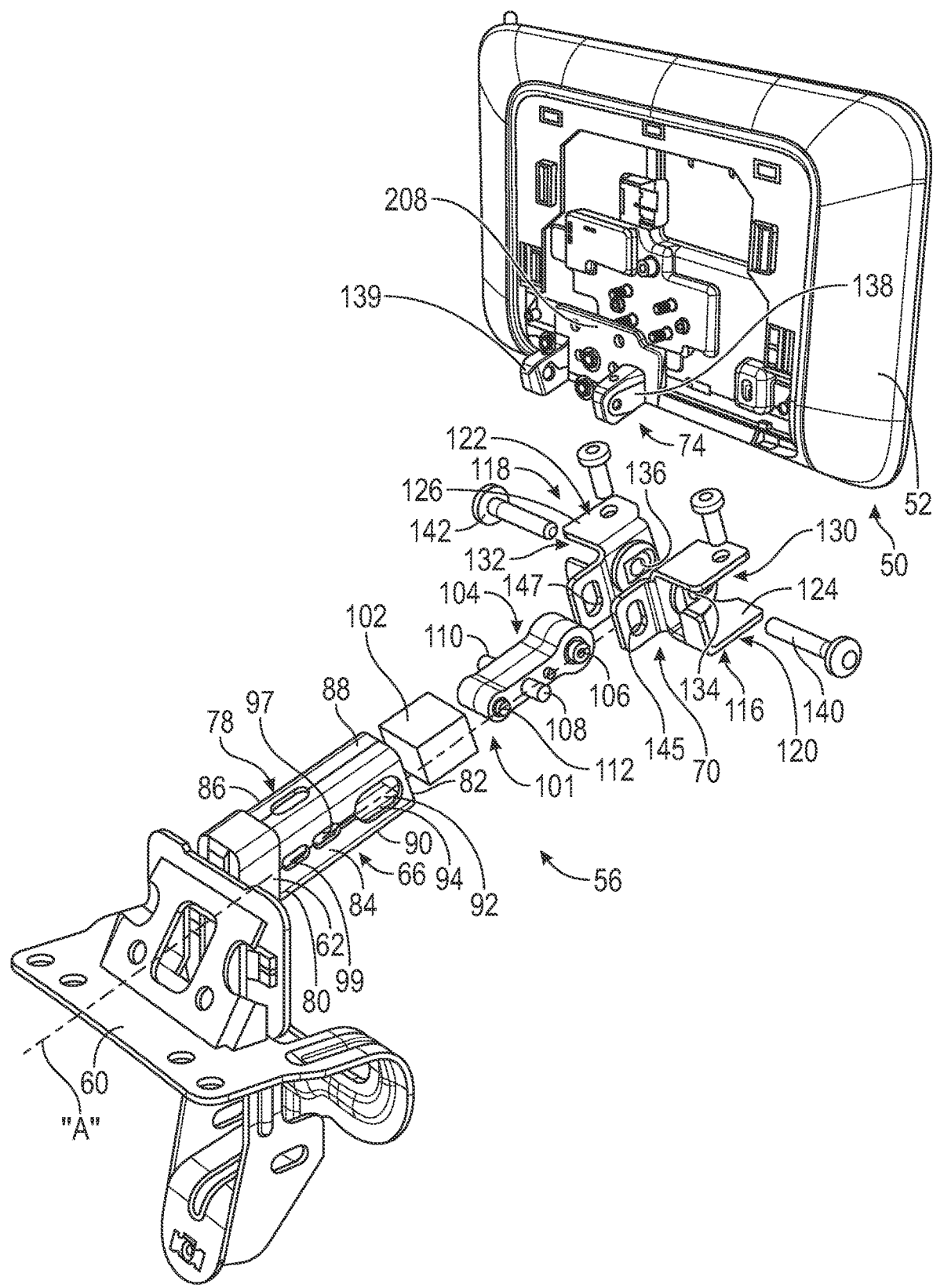
FIG. 4 is a disassembled view of the electronic device mounting system, in accordance with a non-limiting example.

In a non-limiting example shown in FIGS. 3 and 4 and with continued reference to FIG. 2, electronic device mount 56 includes a mounting element 60 having a support 62 coupled to upper surface 48 of seat back 44. A bracket 66 coupled to mounting element 60. A hinge member 70 is coupled between bracket 66 and display 52. An adapter plate 74 serves as an interface between hinge member 70 and display 52. As will be detailed more fully herein, bracket 66, in addition to supporting display 52, also accommodates head impact forces in the event vehicle 10 experiences a sudden deceleration.

In a non-limiting example, bracket 66 includes a plurality of walls 78. Plurality of walls 78 extend between a first end 80 and a second end 82 of bracket 66. A deformation axis "A" is defined between first end 80 and second end 82 of bracket 66. First end 80 is connected to support 62 and second end 82 is connected to hinge member 70. In a non-limiting example, plurality of walls 78 include a first side wall 84, a second side wall 86, a top wall 88, and a bottom wall 90. Plurality of walls 78 define a hollow interior 92 (FIG. 4) of bracket 66. A this point, it should be understood that the terms "top" and "bottom" are relative terms that may be interchangeable depending upon the perspective of the figures.

Figure 5A:
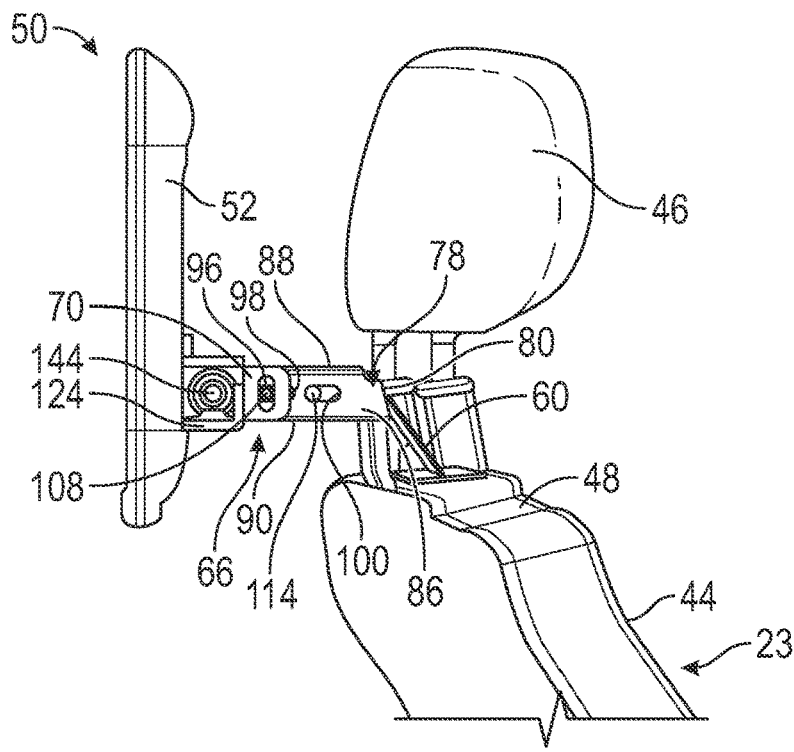
FIG. 5A is a side view of a display coupled to electronic device mounting system prior to receiving an impact, in accordance with a non-limiting example.

In a non-limiting example, first side wall 84 includes a first slotted or elongated opening 94 and second side wall 86 includes a second slotted or elongated opening 96 (FIG. 5A). First slotted opening 94 and second slotted opening 96 include a major dimension that extends along deformation axis "A". Bracket 66 also includes an opening element, such as shown at 97 formed in first side wall 84 between first slotted opening 94 and first end 80. Opening element 97 is connected to opening 94 through a slot (not separately labeled). An additional opening element 98, FIG. 5A, is formed in second side wall 86. Opening element 97 and additional opening element 98 are elongated in a manner similar to that discussed in connection with first slotted opening 94 and second slotted opening 96.

In a non-limiting example, bracket 66 also includes an inspection opening 99 formed in first side wall 84. An additional inspection opening 100 is provided in second side wall 86. As will be detailed herein, inspection opening 99 and the additional inspection opening provide access for visual inspection to determine whether electronic device mount 56 has been subjected to an impact that requires servicing.

In a non-limiting example, a deformation assembly 101 is arranged in hollow interior 92. Deformation assembly 101 includes a deformable member 102 arranged in hollow interior 92 at first end 80 and a deformable element 104. Deformable member 102 may take on a variety of forms including a metal spring, a metal alloy, a rubber component, a foam component, a plastic components, and/or other elastomeric materials such as an elastomer. Deformable member 102 possesses both elastic and inelastic properties. That is, deformable member 102 may deform elastically when subjected to impacts having a force below a deformation threshold. That is, deformable member 102 may compress an amount that defines an elastic region, (e.g, deformable member 102 may compress and recover when being handled, bumped, manipulated and the like).

In a non-limiting example, deformable member 102 may also deform inelastically when subjected to impacts having a force that exceeds the deformation threshold. For example, during a sudden deceleration of vehicle 10, an occupant may pitch forward and impact display 54 with their head. The head impact may be of a sufficient force to compress deformable member 102 inelastically. Thus, while deformable member 102 may absorb energy from the head impact so as to mitigate injury, it may require replacement in order for electronic device mount 56 to continue to function as designed.

In a non-limiting example, deformable element 104 is arranged between deformable member 102 and second end 82. In a non-limiting example, a passage 106 extends through deformable element 104 along an axis that is substantially perpendicular to deformation axis "A". Passage 106 aligns with first slotted opening 94 and second slotted opening 96. A first pin 108 extends from deformable element the axis in a first direction substantially parallel to passage 106 and a second pin 110 extends from deformable element in a second direction, that is opposite the first direction, substantially parallel to passage 106. Deformable element also includes a first indicator member 112 and a second indicator member 114, FIG. 5A.

Figure 5B:
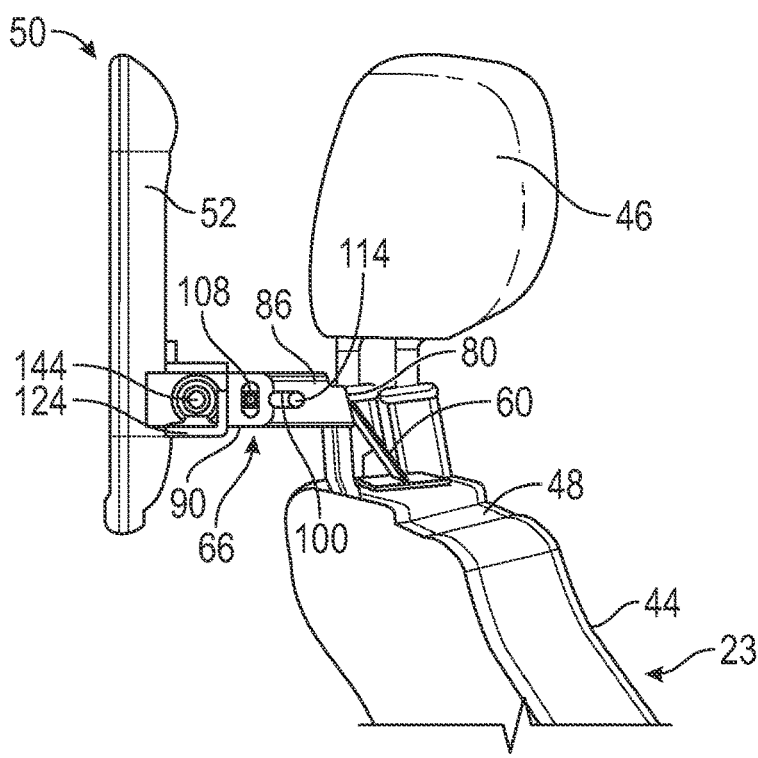
FIG. 5B is a side view of a display coupled to electronic device mounting system after receiving the impact, in accordance with a non-limiting example.
Figure 6A:
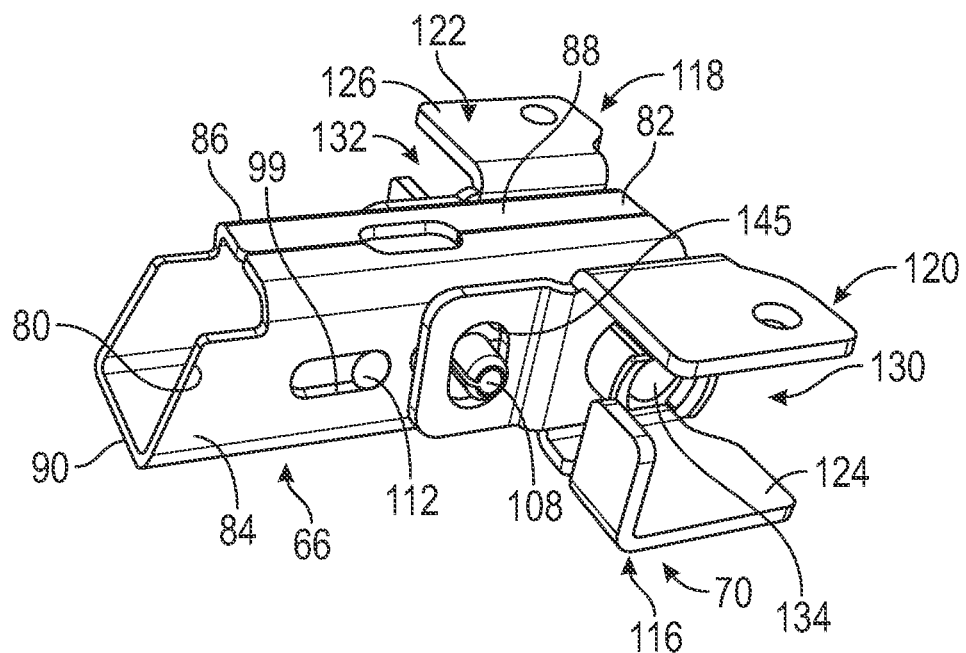
FIG. 6A is a perspective view of a bracket of the electronic device mounting system including an indicator in a normal position, in accordance with a non-limiting example.
Figure 6B:
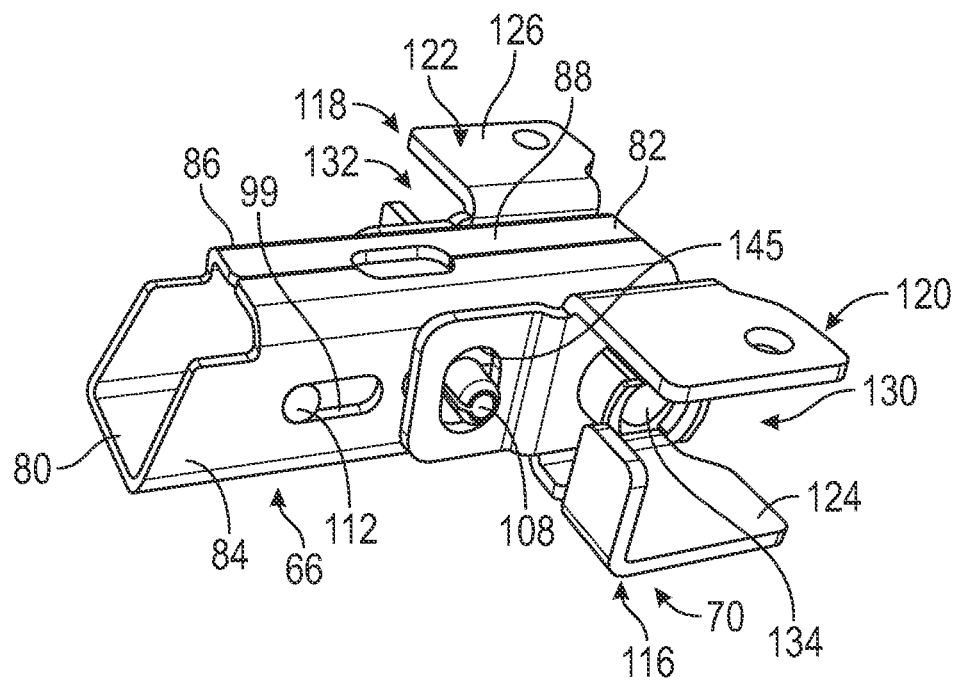
FIG. 6B is a perspective view of the bracket of FIG. 6A showing the indicator signaling that an impact has occurred.

In a non-limiting example, if electronic device mount 56 is subjected to an impact that exceeds the deformation threshold, deformable member 102 will compress elastically such that first indicator member 112 and second indicator member 114 of deformable element 104 shift along inspection opening 99 and the additional inspection opening 100 from a first position such as shown in, FIG. 5A and FIG. 6A to a second position such as shown in, FIG. 5B and FIG. 6B. The change in position of first and second indicator members 112 and 114 signals that deformable member 102 has undergone an inelastic deformation causing electronic device mount 56 to require repair or replacement.

In a non-limiting example, hinge member 70 includes a first bracket element 116 pivotally connected to first side wall 84 of bracket 66 and a second bracket element 118 pivotally connected to second side wall 86 of bracket 66. First bracket element 116 includes a first electronic device mounting portion 120 and second bracket element 118 includes a second electronic device mounting portion 122. First electronic device mounting portion 116 includes a first plurality of wall elements 124 and second electronic device mounting portion 118 include a second plurality of wall elements 126. First plurality of wall elements 124 define a first pocket 130 and second plurality of wall elements 126 form a second pocket 132. First pocket 130 and second pocket 132 serve as an interface between hinge member 70 and adapter plate 74 as will become more fully evident herein.

In a non-limiting example, a first opening 134 is formed in first pocket 130 and a second opening 136 is formed in second pocket 132. First opening 134 and second opening 136 align with passage 106 in deformable element 104, first slotted opening 94 and second slotted opening 96 in bracket 66. A first mounting ear 138 of adapter plate 74 nests within first pocket 130 and a second mounting ear 139 of adapter plate 74 nests within second pocket. First pocket 130 and second pocket 132 constrain rotation of display 52 to move with hinge member 70.

A first fastener 140 extends through first mounting ear 138, first opening 134 and first slotted opening 94, and engages with deformable element 104 via passage 106. Similarly, a second fastener 142 extends through second mounting ear 139, second opening 136, and second slotted opening 96, and engages with deformable element 104 via passage 106. First fastener 140 and second fastener 142 define a pivot axis for hinge member 70. Further, by extending through corresponding ones of first slotted opening 94 and second slotted opening 96, first fastener 140 and second fastener 142 may guide infotainment system 50 along deformation axis "A" in the event of an impact to display 52. In a non-limiting example, first bracket element 116 includes a third slotted opening 145 and second bracket element 118 includes a fourth slotted opening 147. Third slotted opening 145 and fourth slotted opening 147 includes a major dimension that extends substantially perpendicularly relative to deformation axis "A".

In a non-limiting example, first pin 108 extends through third slotted opening 145 and second pin 110 extends through fourth slotted opening 147. First pin 108 and second pin 110 in addition to guiding deformable element 104 towards deformable member 102 act as a first travel limiter and a second travel limiter as hinge member 70 pivots about the pivot axis defined by first fastener 140 and second fastener 142. That is, display 52 may pivot about the pivot axis. At this point, it should be understood that the mounting system described herein not only supports an electronic device and accommodates impacts that may result from sudden decelerations but also accommodates viewing angle adjustment of the electronic device display.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:
1. An electronic device mounting system for a vehicle comprising:
   a mounting element configured to connect with a vehicle seat surface;
   a bracket supported by the mounting element, the bracket having a plurality of walls defining a hollow interior; and
   a deformation assembly including a deformable element and a deformable member arranged in the hollow interior, the deformable element being elastically and inelastically deformable based in impact forces passing into the bracket.

2. The electronic device mounting system according to claim 1, wherein the bracket includes a first end coupled to the mounting element and a second end, opposite the first end, a deformation axis being defined between the first end and the second end.

3. The electronic device mounting system according to claim 2, wherein at least one of the plurality of walls of the bracket includes an inspection opening.

4. The electronic device mounting system according to claim 3, wherein the deformable element includes a visual indicator visible through the inspection opening, the visual indicator signaling that the electronic device mounting system has been exposed to a force along the deformation axis that exceeds a deformation threshold.

5. The electronic device mounting system according to claim 2, wherein the deformable member is configured to compress along the deformation axis.

6. The electronic device mounting system according to claim 1, wherein the deformable member is formed from one of an elastomer, a foam, and a plastic.

7. The electronic device mounting system according to claim 1, wherein the deformable member is formed from one of a metal and a metal alloy.

8. The electronic device mounting system according to claim 2, wherein the plurality of walls of the bracket includes a first side wall and a second side wall, the first side wall including a first slotted opening and the second side wall including a second slotted opening, each of the first slotted opening and the second slotted opening having a major dimension extending along the deformation axis.

9. The electronic device mounting system according to claim 8, further comprising a hinge member including a first bracket element coupled to the first side wall and a second bracket element coupled to the second side wall, the first bracket element including a first electronic device mounting portion and the second bracket element including a second electronic device mounting portion.

10. The electronic device mounting system according to claim 9, further comprising a first fastener passing through the first bracket element, through the first slotted opening and into the deformable element and a second fastener passing through the second bracket element, through the second slotted opening and into the deformable element.

11. A vehicle comprising:
a body including a passenger compartment;
a seat arranged in the passenger compartment, the seat including a seatback; and
an electronic device mounting system coupled to the seat back, the electronic device mounting system comprising:

a mounting element configured to connect with the seatback;
a bracket supported by the mounting element, the bracket having a plurality of walls defining a hollow interior; and
a deformation assembly including a deformable element and a deformable member arranged in the hollow interior, the deformable element being elastically and inelastically deformable based in impact forces passing into the bracket.

12. The vehicle according to claim 11, wherein the bracket includes a first end coupled to the mounting element and a second end, opposite the first end, a deformation axis being defined between the first end and the second end.

13. The vehicle according to claim 12, wherein at least one of the plurality of walls of the bracket includes an inspection opening.

14. The vehicle according to claim 13, wherein the deformable element includes a visual indicator visible through the inspection opening, the visual indicator signaling that the electronic device mounting system has been exposed to a force along the deformation axis that exceeds a deformation threshold.

15. The vehicle according to claim 12, wherein the deformable member is configured to compress along the deformation axis.

16. The vehicle according to claim 11, wherein the deformable member is formed from one of an elastomer, a foam, and a plastic.

17. The vehicle according to claim 11, wherein the deformable member is formed from one of a metal and a metal alloy.

18. The vehicle according to claim 12, wherein the plurality of walls of the bracket includes a first side wall and a second side wall, the first side wall including a first slotted opening and the second side wall including a second slotted opening, each of the first slotted opening and the second slotted opening having a major dimension extending along the deformation axis.

19. The vehicle according to claim 18, further comprising a hinge member including a first bracket element coupled to the first side wall and a second bracket element coupled to the second side wall, the first bracket element including a first electronic device mounting portion and the second bracket element including a second electronic device mounting portion.

20. The vehicle according to claim 19, further comprising a first fastener passing through the first bracket element, through the first slotted opening and into the deformable element and a second fastener passing through the second bracket element, through the second slotted opening and into the deformable element.

* * * * *